US009289971B2

(12) United States Patent
Dawley et al.

(10) Patent No.: US 9,289,971 B2
(45) Date of Patent: Mar. 22, 2016

(54) SYSTEM AND METHOD FOR MEASURING UNTENSIONED PRODUCT LENGTH OF A WEB DURING PRODUCTION

(71) Applicant: Goss International Americas Inc., Durham, NH (US)

(72) Inventors: Douglas Joseph Dawley, Dover, NH (US); Daniel Matthew Perdue, Rochester, NH (US); Drew Edwin Kiefaber, Newmarket, NH (US)

(73) Assignee: Goss International Americas, Inc, Durham, NH (US)

( * ) Notice: Subject to any disclaimer, the term of this patent is extended or adjusted under 35 U.S.C. 154(b) by 0 days.

(21) Appl. No.: 13/890,475

(22) Filed: May 9, 2013

(65) Prior Publication Data

US 2014/0331878 A1    Nov. 13, 2014

(51) Int. Cl.
*B41F 5/04* (2006.01)
*B41F 13/02* (2006.01)
*B65H 23/188* (2006.01)
*G01B 21/06* (2006.01)

(52) U.S. Cl.
CPC ............ *B41F 13/02* (2013.01); *B65H 23/1888* (2013.01); *G01B 21/06* (2013.01); *B65H 2220/02* (2013.01); *B65H 2404/531* (2013.01); *B65H 2511/172* (2013.01); *B65H 2513/106* (2013.01); *B65H 2515/31* (2013.01); *B65H 2515/37* (2013.01); *B65H 2557/264* (2013.01); *B65H 2801/21* (2013.01)

(58) Field of Classification Search
CPC .............................. B41F 13/02; B65H 23/188
USPC ........................................... 101/219; 226/195
See application file for complete search history.

(56) References Cited

U.S. PATENT DOCUMENTS

| 4,452,140 | A | * | 6/1984 | Isherwood et al. | ........... 101/181 |
| 5,443,008 | A | * | 8/1995 | Pavliny et al. | ................ 101/484 |
| 5,485,386 | A | | 1/1996 | Andreasson | |
| 5,678,484 | A | * | 10/1997 | Callan et al. | .................. 101/226 |
| 5,709,331 | A | | 1/1998 | Lam et al. | |
| 6,991,144 | B2 | * | 1/2006 | Franz et al. | ...................... 226/24 |
| 2007/0051264 | A1 | * | 3/2007 | Sakamoto | ...................... 101/484 |
| 2011/0297026 | A1 | | 12/2011 | Zeinhofer | |

FOREIGN PATENT DOCUMENTS

WO    WO 2008/034759 A1    3/2008

OTHER PUBLICATIONS

Web Ranger, TeleScan Print Inspection, www.tecscan.co.uk.
(Continued)

*Primary Examiner* — Matthew G Marini
(74) *Attorney, Agent, or Firm* — Davidson, Davidson & Kappel, LLC

(57) ABSTRACT

A system and method is provided for determining an untensioned product length of a web moving through a printing press under tension. A controller determines a tensioned repeat length of the web in a span of the printing press while the web is moving through the printing press under tension; determines an elastic strain of the web in the span of the printing press while the web is moving through the printing press under tension; and calculates an untensioned product length of the web in the span of the printing press while the web is moving through the printing press under tension as a function of the tensioned repeat length and the elastic strain.

20 Claims, 2 Drawing Sheets

(56) References Cited

OTHER PUBLICATIONS

Web Ranger Download Brochure, TeleScan Print Inspection, www.tecscan.co.uk/webranoer.htm.; retrieved Mar. 8, 2013.
Muller Martini, "Stretch Correct™ Opens up New Market Segments for Web Offset Printing", Panorama, Dec. 2009.
Narrow Webtech, Global Technology Source for Roll Label, Narrow-Web Packaging and Folding Carton Printers & Converters, E 50568, vol. 12 ( pp. 12-13) Nov. 2009.
Muller Martini, Web Offset Printing Expands into New Areas of Application with Stretch Correct™, Muller Martini Corportes, www.mullermartini.com/eng/desktopfault.aspx/tabid-135/259_read-121269 ; retrieved Mar. 7, 2013.

* cited by examiner

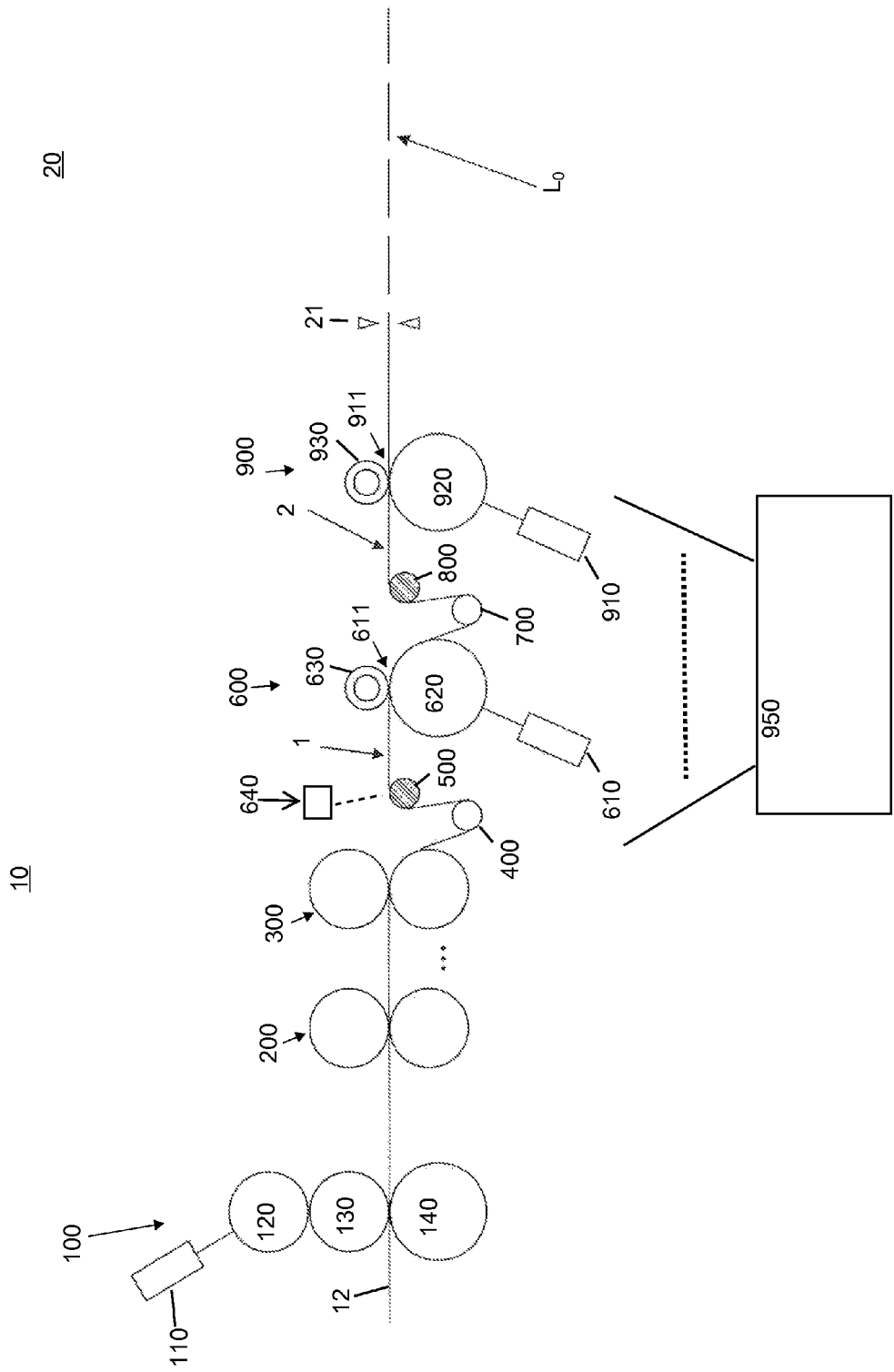

SYSTEM AND METHOD FOR MEASURING UNTENSIONED PRODUCT LENGTH OF A WEB DURING PRODUCTION

This application relates to a system and method for measuring untensioned product length of a web in a printing press.

This application is related to co-owned U.S. patent application Ser. No. 13/830,485, entitled CLOSED LOOP CONTROL OF UNTENSIONED PRODUCT LENGTH ON A WEB, filed on even date herewith, the entire disclosure of which is hereby incorporated by reference.

BACKGROUND INFORMATION

There is a need in the web press industry to control the length of the final, untensioned product. This is especially important when working with thin, low-stiffness substrates that are used, for example, in the packaging industry. In general, thin, low-stiffness substrates have a thickness of from about 0.0003 to about 0.0030 inches, and a tensile stiffness below about 500 lbs. per inch. Nonlimiting examples of such materials are PET film (0.00048 inches, 360 lb./inch), EUR70 film (0.0026 inches, 423 lb./inch), and BOPP film (0.0009 inches, 223 lb./inch).

In order to control the untensioned product length it must first be measured. In today's industry, the untensioned product length is sometimes measured directly. This can be accomplished by cutting a sample from the web, laying it out flat and untensioned on a table, and measuring it with a mechanical or video measurement system.

Attempts have also been made to define the untensioned product length by estimating the amount that a given substrate will "snap back" when process tensions are removed. One example of this appears to be the Muller Martini "Stretch Correct" system, as described in a technical article entitled "Web-offset to gain new fields of application: StretchCorrect—a striking innovation for film printing", in NarroWebTech 4-2009, pages 12-14 (November 2009).

TecScan's Web Ranger system claims to "display in real time print length measurements of every repeat". TecScan Web Ranger Brochure (2005). Assuming arguendo that this system works as described, it is believed to at most be able to approximate the repeat length of a strained (tensioned) web only.

BRIEF SUMMARY OF THE INVENTION

In accordance with a first embodiment of the present invention, a system and method for determining an untensioned product length of a web moving through a printing press under tension is provided. In accordance with this system and method, a controller determines a tensioned repeat length of the web in a span of the printing press while the web is moving through the printing press under tension. The controller determines an elastic strain of the web in the span of the printing press while the web is moving through the printing press under tension, and calculates an untensioned product length of the web in the span of the printing press while the web is moving through the printing press under tension as a function of the tensioned repeat length and the elastic strain.

The aforementioned embodiment may also include other optional components and features. For example:

In accordance with further aspects of the first embodiment, the step of determining the tensioned repeat length may include calculating the tensioned repeat length as a function of a reference repeat length and a velocity gain in the span. Moreover, the velocity gain may be calculated as a function of drive setpoints for a motor driving the web in the span, where the drive setpoints include a drive for transport gains for tension, and a drive setpoint for transport gains for repeat length.

In accordance with other aspects of the first embodiment, the tensioned repeat length of the web in the span of the printing press may alternatively be determined with a camera.

In accordance with yet another aspect of the first embodiment, the step of determining the tensioned repeat length of the web in the span of the printing press may alternatively comprise measuring a velocity $V_1$ of the web in the span; and calculating a tensioned repeat length $L_1$, as $L_1=(t_{repeat})(V)$, where $t_{repeat}$ is a time for the plate cylinder of the press to print one non-repeating image.

In accordance with still other aspects of the first embodiment, the step of determining the elastic strain may include measuring, with a sensor, a tension in the span, determining a stiffness of the web, and calculating the elastic strain as a function of the tension and the stiffness. Moreover, the step of determining the stiffness of the web may include measuring tension in the web at two different velocity gains. Further, the two different velocity gains may comprise a first velocity gain at a first motor, and a second velocity gain at a second motor, the first motor driving the web via a first roller, the second motor driving the web via a second roller.

In accordance with yet another aspect of the first embodiment, the step of calculating the untensioned product length may comprise calculating, during a production run, an untensioned product length $L_0(t)$ over time t: $L_0(t)=L_1(t)(1+\epsilon_1(t))$, where, at any given time t, $L_0$ is the untensioned product length, $L_1$ is the strained repeat length at the span, and $\epsilon_1$ is the elastic strain of the web in the span; and wherein $\epsilon_1=T_1(t)/E(t)$, where $T_1$ is the tension at the span, and E is the web modulus.

In accordance with a second embodiment of the present invention, a web fed printing press for printing on a continuous web and cutting the web into printed products having an untensioned product length is provided. The press includes a printing unit including a plate cylinder, a blanket cylinder, and an impression cylinder, where the plate cylinder has a reference repeat length. A plurality of rollers are located downstream of the printing unit, and the web moves under tension through the printing unit and the plurality of rollers as it moves through the press. A controller is configured and arranged to generate an untensioned product length of the web as it moves through a printing press under tension. The controller determines a tensioned repeat length of the web in a span located between an adjacent pair of the plurality of rollers, while the web is moving through the printing press under tension; determines an elastic strain of the web in the span of the printing press while the web is moving through the printing press under tension, and calculates an untensioned product length of the web in the span of the printing press while the web is moving through the printing press under tension as a function of the tensioned repeat length and the elastic strain.

The aforementioned second embodiment may also include other optional components and features. For example:

In accordance with yet another aspect of the second embodiment, the controller may calculate the untensioned product length by: calculating, during a production run, an untensioned product length $L_0(t)$ over time t: $L_0(t)=L_1(t)/(1+\epsilon_1(t))$, where, at any given time t, $L_0$ is the untensioned product length, $L_1$ is the tensioned repeat length at the span, and $\epsilon_1$ is the elastic strain of the web in the span; and wherein $\epsilon_1 = T_1(t)/E(t)$, where $T_1$ is the tension at the span, and E is the web modulus.

In accordance with yet another aspect of the second embodiment, the press may include a tension sensor for sensing a tension in the span, the controller coupled to the sensor for detecting the tension $T_1$.

In accordance with yet other aspects of the second embodiment, the tension sensor described in the preceding paragraph may, for example, be a first tensioning roller, and the first tensioning roller may be one of the plurality of rollers. The first tensioning roller may be located upstream and adjacent to a first driven roller, wherein the first driven roller is one of the plurality of rollers. In accordance with yet another aspect of the second embodiment, the press may include a second tensioning roller for detecting a tension $T_2$, and the second tensioning roller may be one of the plurality of rollers. The second tensioning roller may be located upstream and adjacent to a second driven roller, wherein the second driven roller is one of the plurality of rollers.

In accordance with a third embodiment of the present invention, a system for determining an untensioned product length of a web moving through a printing press under tension is provided. The system includes a first tensioning roller, a first roller, and a first motor. The moving web contacts the first tensioning roller. The first roller is located downstream of the first tensioning roller, the first roller drives the web, and the first motor drives the first roller. A first span of the web extends between the first tensioning roller and the first roller. The system further includes a second tensioning roller, a second roller, and a second motor. The second tensioning roller is located downstream of the first roller, and the moving web contacts the second tensioning roller. The second roller is located downstream of the second tensioning roller, the second roller drives the web, and the second motor drives the second roller. A second span of the web extends between the second tensioning roller and the second roller. The system also includes a controller. The controller: detects a tension $T_1$ in the first span with the first tensioning roller; detects a tension $T_2$ in the second span with the second tensioning roller; and calculates an untensioned product length as a function of $T_1$, $T_2$, drive setpoints for the first and second motors, a web thickness of the web (h), and a reference repeat length ($CO_{REF}$).

The aforementioned third embodiment may also include other optional components and features. For example:

In accordance with another aspect of the third embodiment, the system may further include a first idler roller forming a first non-slip nip with the first roller, and/or a second idler roller forming a second non-slip nip with the second roller. Alternatively, the web may be arranged in a capstan wrap around at least one of the first roller and the second roller.

In accordance with yet another aspect of the third embodiment, the drive setpoints may include a drive setpoint $\alpha_1$ of the first motor for transport gains for tension ($T_1$), a drive setpoint (($\beta_1$) of the first motor for transport gains for repeat length of the first span, a drive setpoint ($\alpha_2$) of the second motor for transport gains for tension ($T_2$), and a drive setpoint ($\beta_2$) of the second motor for transport gains for repeat length of the second span.

In accordance with another aspect of the third embodiment, the controller may calculate the untensioned product length ($L_0$), according to the formula:

$$L_0 = \left(CO_{REF}(1+\alpha_1)(1+\beta_1)\left(1+\frac{(h/2)}{R_1}\right)\right) / (1+T_1/E),$$

where $$E = \frac{T_2 - T_1}{(1+\alpha_2)(1+\beta_2)\left(1+\frac{(h/2)}{R_2}\right) - (1+\alpha_1)(1+\beta_1)\left(1+\frac{(h/2)}{R_1}\right)}$$

and where $R_1$ is a radius of the first roller and $R_2$ is a radius of the second roller.

BRIEF DESCRIPTION OF THE DRAWINGS

The present invention will be further described with respect to the following Figures, in which:

FIG. 1a illustrates a printing press in accordance with an embodiment of the present invention including an untensioned product length measurement system.

DETAILED DESCRIPTION OF PREFERRED EMBODIMENTS OF THE INVENTION

Figure 1B:
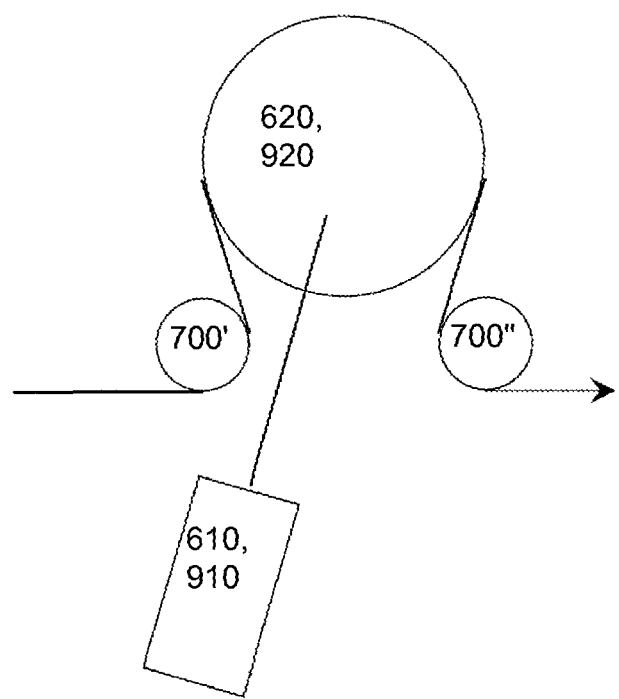
FIG. 1b shows a capstan roller arrangement which may be provided as an alternative to non-slip roller pair 600 and/or 900 of FIG. 1A.

As explained above, in order to control the untensioned product length it must first be measured. In today's industry, the untensioned product length is sometimes measured directly. This can be accomplished by cutting a sample from the web, laying it out flat and untensioned on a table, and measuring it with a mechanical or video measurement system. Theoretically, it is also possible to measure the untensioned length of a printed product in the press by setting a span to zero tension and taking a direct measurement. This could be done with a static web or, under special circumstances, a moving web.

As noted above, attempts have also been made to define the untensioned product length by estimating the amount that a given substrate will "snap back" when process tensions are removed.

As also explained above, the TecScan Web Ranger system claims to "display in real time print length measurements of every repeat". TecScan Web Ranger Brocure (2005). Although the details of the TecScan Web Ranger system are unknown to applicant, it is believed that in this system a precision shaft encoder is the only measurement hardware on the press. Assuming no slip between the web and roller, this type of system could theoretically measure the local web speed. The web speed multiplied by repeat time (if known) can generate the strained repeat length in the measurement span. Accordingly, even if this system works as described, it is believed to at most be able to approximate the repeat length of a strained (tensioned) web only. The accuracy of this measurement of strained (tensioned) repeat length is dependent on the accuracy of those two variables.

Direct, off-line measurements of the untensioned product length can be used as a QC (Quality Control) tool but can be time consuming and difficult to perform accurately. To perform a measurement, the web is stopped and a sample must be cut out. The sample is then transported to a measurement area where it can be laid out flat and smooth. Care must be taken not to wrinkle or stretch the material. Since this is an offline measurement, it cannot be used for feedback in a control system.

Measuring the untensioned product length in the press presents its own set of problems. First, the web must be printed. However, not all products in which repeat length is a concern are printed. Second, the web cannot be transported at zero tension in a typical web press operation. Attempts to do so can result in wrinkling and/or web-weave, especially with thin, low stiffness substrates. Third, even where it is possible to transport a web at zero tension, the speed will be limited. Since these in-press measurements cannot be performed under normal production conditions they cannot be used as feedback in a control system.

Estimating the untensioned product length based on an amount of snap-back that is assumed for a given material or job will provide only a rough approximation of the untensioned product length. The actual snap-back is a function of both the process tensions, and a web modulus that can vary significantly within a job. This method also assumes that the amount of plastic strain introduced in the production process is known (it is most likely assumed to be zero), and this may not be the case. Further, this type of estimate would provide information for one adjustment only, and cannot be used as feedback in a control system.

In accordance with various embodiments of the present invention, the untensioned repeat length can be accurately defined while the press is running. Real-time, untensioned repeat length feedback will enable process control in production. Closed-loop control would allow the repeat length to be maintained without operator intervention. As used in the art, the term "repeat length" refers to the length of printed image(s) in a rotary printing press before they repeat. In a typical rotary press, the "repeat length" corresponds to the circumference of the plate cylinder, and is sometimes also referred to as the "cut-off" of the press. Since the web onto which the images are printed is elastic, the repeat length of the plate cylinder (reference repeat length) will differ from the repeat length of the printed web under tension (tensioned or strained repeat length) which in turn will differ from the repeat length of the printed sheets after the web is cut into sheets (untensioned repeat length or untensioned product length). As used herein, the term untensioned repeat length and untensioned product length are used interchangeably, as are the terms tensioned repeat length and strained repeat length.

In the preferred embodiment, both the product's repeat length (under tension) and the strain in the web are defined in a span toward the end of the press. The strain in the product is then mathematically removed to define the untensioned repeat length during a production run. The physics and mathematics that can be used to provide the untensioned repeat length are summarized below. However, as an initial, matter, it is helpful to provide an overview of the process from an engineering perspective and from a pressman's perspective.

From an engineering perspective, a product's untensioned repeat length can be calculated in accordance with the various embodiments of the present invention by defining its tensioned repeat length in a span, then mathematically removing the elastic strain in that span. The tensioned repeat length can be calculated by applying all of the gains in the measurement span to the reference repeat length (cut off). The elastic strain in the measurement span can be defined if the web's tension and its stiffness are known. The tension is a direct measurement. The stiffness can be defined by measuring the web tensions at two different gains. The untensioned repeat length can be adjusted by changing the relative velocity of the image and the web.

Viewed instead from the perspective of a pressman, a product's untensioned repeat length can be calculated in accordance with the various embodiments of the present invention by finding its repeat length under tension, then subtracting the amount that it will snap back when the tension is released. The repeat length in a span under tension can be calculated if the repeat length at the printing unit (the cut off) and the velocity of the web in that span are known. The amount that a repeat length will snap back can be found with knowledge of both the web's tension and how stiff the web is. The tension is measured in the press with sensors. The web's stiffness can be found by stretching it two different amounts and measuring the two different tensions that result. The untensioned repeat length can be adjusted by changing how much web passes each time that an image is laid down.

FIG. 1a illustrates a printing press 10 which includes a printing unit 100 printing on a web 12. Printing unit 100 includes a drive 110, a plate cylinder 120, a blanket cylinder 130, and an impression cylinder 140. Impression cylinder is a hard cylinder having an outer surface made, for example, of metal such as steel or aluminum. Blanket cylinder 130 carries a printing blanket having an outer layer made of an elastomeric material such as natural or synthetic rubber. Plate cylinder 120 holds the image carrier, for example, a printing plate. Although a single printing unit 100 is shown, it should be understood that additional printing units 100 may also be provided upstream of printing unit 100. Drive 110 may be a single motor which drives plate cylinder, blanket cylinder and impression cylinder, or may include more than one motor such that each cylinder is driven by a different motor, or two of the cylinders are driven by one motor, and the third driven by a different motor. Although an individual motor is shown for each printing unit, it should be appreciated that as an alternative, a line shaft can be used to drive all printing units from a single motor. The time it takes for each repeat length to print is: $t_{repeat}=2\pi/\omega$, where $\omega$ is the rotational speed of the cylinder 120 in radians per second.

The printing press 10 may also include other subsequent processes 200, 300, which may for example, include a dryer, a chill roll stand, slitters, and angle bars for example. After the optional processes 200, 300, the web 12 passes over an Idler roller 400 and a tensioning roller 500. Tensioning roller 500 measures the tension in the web as is known in the art. From the tensioning roller 500, the web 12 passes through a nip 611 formed between rollers 620 and 630 of non-slip roller pair 600. A motor 610 drives roller 620. Motor 610 is preferably a servomotor. Roller 620 is preferably a hard roller and roller 630 is preferably a soft idler roller in order to form a non-slip nip. Typically, roller 620 would be made of a metal such as aluminum or steel, whereas roller 630 typically has an elastomeric coating made for example of natural or synthetic rubber. Span 1 is defined as the segment of the web 12 between roller 500 and nip 611. Span 1 has a tension $T_1$, a strained velocity $V_1$, a strained repeat length $L_1$ and a web thickness h. Motor 610 applies a gain relative to the reference velocity $V_{ref}$ of the press based on a number of factors. In this example, the gain is based on two factors: $\alpha_1$, a drive setpoint for transport gains for tension T; and $\beta_1$, a drive setpoint for transport gains for repeat length $L_1$. As one of ordinary skill in the art will appreciate, $\alpha$ and $\beta$ are setpoints that are used in the art to program the motor 610. As explained below, $V_1$ is a function of Vref, $\alpha_1$, and $\beta_1$, as well as h (web thickness), and $R_1$ (the radius of roller 620). Alternatively, it is possible to directly measure $V_1$ based, for example, on the rotational speed of the motor 620 as measured by an encoder or resolver.

After exiting nip 611, the web 12 passes over an idler roller 700 and a tensioning roller 800. From the tensioning roller 800, the web 12 passes through a nip 911 formed between rollers 920 and 930 of non-slip roller pair 900. A motor 910 drives roller 920. Motor 910 is preferably a servomotor, and drives roller 920 in the same manner described above as a function of $\alpha_2$ and $\beta_2$. Roller 920 is preferably a hard roller and roller 930 is preferably a soft idler roller in order to form a non-slip nip. Typically, roller 920 would be made of a metal such as aluminum or steel, whereas roller 930 typically has an elastomeric coating made for example of natural or synthetic rubber. Span 2 is defined as the segment of the web 12 between roller 800 and nip 911. Span 2 has a tension $T_2$, a strained velocity $V_2$, a strained repeat length $L_2$ and web thickness h. Downstream of the nip 911 the web is eventually cut as is known in the art. It should be understood that it may be cut on-line with a folder, or may be rewound and later cut off-line in any other manner. In any event, after being cut from the web, the sheets will have an untensioned repeat length $L_0$.

Although non-slip roller pairs are preferred, alternatively, rollers 620, 630 (and/or rollers 920, 930) could be replaced with a single hard roller arranged to provide a non-slip condition with a capstan wrap as shown in FIG. 1b. In FIG. 1B, a capstan wrap is implemented over roller 620 (or 920) via a pair of idler rollers 700', 700".

The strained repeat length is calculated by applying known modifications to the reference repeat length (also commonly referred to in the art as the cut-off). These modifications include the velocity gains ($\alpha 1$, $\beta 1$, or $\alpha 2$, $\beta 2$) that are applied to a downstream motor (610 or 910) that controls the web velocity in the span (1 or 2) of interest. Another modification accounts for the effect of a web's thickness (h) on the "pitch line" of web over the roll that controls its velocity. These modifications can be readily and accurately determined for a given print job on a given press. When employing servo drives as motors (610 or 910), the gains can be the exact setpoints that are used to control the servo drives. Any error in the web's "pitchline modification" will be very small because the modification is $(h/2)/R_1$: half of a very small number (the web's thickness, h) divided by a relatively large number (the driven roll's radius $R_1$). The strain in the span is calculated by dividing the web's tension in the span by its modulus ($\epsilon_1 = T_1/E$). In the preferred embodiment, the span's tension is measured directly using any number of commercially available technologies. In FIG. 1, for example, a tensioning roller 500 is used for span 1, and a tensioning roller 800 is used for span 2. In the preferred embodiment, the web's modulus is determined by dividing the tension differential in two different spans by the strain differential in these two spans ($\epsilon_1 = \Delta T/\Delta\epsilon$). The strain differential, in turn, is determined from velocities $V_1$, $V_2$, and $V_{ref}$ as follows: $\Delta\epsilon = (V_2 - V_1)/V_{ref}$. Since the tension and strain measurements can all be taken during a production run, the modulus (E) can be calculated during a production run. This can be important since the modulus is known to vary both within a roll and from one roll to the next of the same nominal web. The untensioned product length can then be calculated during a production run as $L_0(t) = L_1(t)/(1 + T_1(t)/E(t))$, where, at any given time t, $L_0$ is the untensioned product length, $L_1$ is the strained repeat length at span 1, $T_1$ is the tension at span 1, and E is the calculated modulus E. Accurate feedback of the untensioned product length can be provided during production using the procedures outlined above.

Other embodiments, alternatives, and enhancements can also be provided. The strained product length can be measured directly using a camera 640 or cameras. These measurement systems are available in the printing industry. The strained repeat or product length can also be calculated by measuring the web velocity and multiplying it by the time to generate a repeat (for example, one image cylinder revolution). The web velocity can be measured directly using any number of devices, such as laser velocity sensors, or indirectly using a precision encoder and non-slipping idler roll.

Depending on the substrate's consistency and the process requirements, the web thickness can be a one-time operator input or a real-time measurement. Real-time web thickness measurement systems are readily available. In the preferred embodiment described above, the web's modulus is defined by dividing the tension differential in two different spans by the strain differential in these two spans. The web's modulus can also be defined by recording the tensions at two different strains in the same span. This however would not provide a real-time modulus value. The modulus could also be an operator input or pulled from a previously established look up table.

An untensioned repeat length generator generates a calculated untensioned repeat length over time, $L_0(t)$. As one of ordinary skill in the art will appreciate, calculation of the untensioned repeat length over time $L_0(t)$, may for example, be performed by computer, processor, or PLC executing software. Alternatively, it could be implemented entirely in hardware, for example, as an ASIC ("application-specific integrated circuit"), FPLD ("Field-Programmable Logic Device"), or otherwise implemented in discrete hardware. As used herein, the term controller is defined as encompassing any and all of the forgoing, including a controller which comprises one or more computers, processors, or PLCs executing software; a controller which is implemented entirely in hardware, for example, as an ASIC, FPLD, or other discrete hardware; as well as combinations of the forgoing. FIG. 1 illustrates such a controller 950, which generates the calculated untensioned repeat length over time, $L_0(t)$. In the example of FIG. 1, generator 950 would receive inputs over time (t) from the tensioning rollers 500 and 800, and would also receive the velocity gains ($\alpha 1$, $\beta 1$, $\alpha 2$, $\beta 2$) that are applied to a downstream drives 610, 910). Individual connections are omitted for ease of illustration, but as one of ordinary skill in the art will appreciate, the velocity gains could be received either from the drives themselves, or for example, from a control system providing the velocity gains to the drives.

The following is a non-limiting example of how untensioned repeat length can be determined during production on the system of FIG. 1a:

$$\epsilon_1 = T_1/E, \qquad \qquad \text{H)}$$

where E=Web Modulus

Subbing G and H into B yields:

$$L_0 = (CO_{REF}(1+\alpha_1)(1+\beta_1)(1+(h/2)/R_1))/(1+T_1/E) \qquad \text{J)}$$

The web modulus E can be calculated as $$K) \quad E = \frac{\Delta T}{\Delta \varepsilon}$$

$$L) \quad \Delta \varepsilon = \frac{V_2 - V_1}{V_{REF}}$$

$$\Delta\epsilon = (V_{REF}(1+\alpha_2)(1+\beta_2)(1+(h/2)/R_2) - (1+\alpha_1)(1+\beta_1)(1+(h/2)/R_1))/V_{REF} \qquad \text{M)}$$

$$\Delta\epsilon = (1+\alpha_2)(1+\beta_2)(1+(h/2)/R2) - (1+\alpha_1)(1+\beta_1)(1+(h/2)/R_1) \qquad \text{N)}$$

$$\Delta T = T_2 - T_1 \qquad \qquad \text{P)}$$

Subbing N & P into K yields:

$$Q)\quad E = \frac{T_2 - T_1}{(1+\alpha_2)(1+\beta_2)\left(1+\frac{h/2}{R_2}\right) - (1+\alpha_1)(1+\beta_1)\left(1+\frac{h/2}{R_1}\right)}$$

Finally, subbing Q into J yields the untensioned repeat length $L_0$.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for determining an untensioned product length of a web moving through a printing press under tension, comprising, using a controller:
    determining a tensioned repeat length of the web in a span of the printing press while the web is moving through the printing press under tension;
    determining an elastic strain of the web in the span of the printing press while the web is moving through the printing press under tension;
    calculating an untensioned product length of the web in the span of the printing press while the web is moving through the printing press under tension as a function of the tensioned repeat length and the elastic strain; and
    controlling the printing press using the untensioned product length.

2. The method of claim 1, wherein the step of determining the tensioned repeat length comprises calculating the tensioned repeat length as a function of a reference repeat length and a velocity gain in the span.

3. The method of claim 2, wherein the velocity gain is calculated as a function of drive setpoints for a motor driving the web in the span, the drive setpoints including a drive for transport gains for tension, and a drive setpoint for transport gains for repeat length.

4. The method of claim 1, wherein the step of determining the elastic strain comprises
    measuring, with a sensor, a tension in the span,
    determining a stiffness of the web, and
    calculating the elastic strain as a function of the tension and the stiffness.

5. The method of claim 4, wherein the step of determining the stiffness of the web comprises measuring tension in the web at two different velocity gains.

6. The method of claim 5, wherein the two different velocity gains comprise a first velocity gain at a first motor, and a second velocity gain at a second motor, the first motor driving the web via a first roller, the second motor driving the web via a second roller.

7. The method of claim 1, wherein the step of calculating the untensioned product length comprises
    calculating, during a production run, an untensioned product length $L_0(t)$ over time t:
    $L_0(t)=L_1(t)/(1+\epsilon_1(t))$, where, at any given time t, $L_0$ is the untensioned product length, $L_1$ is the strained repeat length at the span, and $\epsilon_1$ is the elastic strain of the web in the span;
    and wherein $\epsilon_1=T_1(t)/E(t)$, where $T_1$ is the tension at the span, and E is the web modulus.

8. The method of claim 1, wherein the tensioned repeat length of the web in the span of the printing press is determined with a camera.

9. The method of claim 1, wherein the step of determining the tensioned repeat length of the web in the span of the printing press comprises:
    measuring a velocity $V_1$ of the web in the span; and
    calculating a tensioned repeat length $L_1$, as $L_1=(t_{repeat})(V_1)$, where $t_{repeat}$ is a time for a plate cylinder of the press to print one non-repeating image.

10. A web fed printing press for printing on a continuous web and cutting the web into printed products having an untensioned product length, the press comprising:
    a printing unit including a plate cylinder, a blanket cylinder, and an impression cylinder, the plate cylinder having a reference repeat length;
    a plurality of rollers located downstream of the printing unit, the web moving under tension through the printing unit and the plurality of rollers as it moves through the press,
    a controller configured and arranged to generate an untensioned product length of the web as it moves through a printing press under tension, the controller determining a tensioned repeat length of the web in a span located between an adjacent pair of the plurality of rollers, while the web is moving through the printing press under tension, determining an elastic strain of the web in the span of the printing press while the web is moving through the printing press under tension, and calculating an untensioned product length of the web in the span of the printing press while the web is moving through the printing press under tension as a function of the tensioned repeat length and the elastic strain.

11. The press of claim 10, wherein controller calculates the untensioned product length by:
    calculating, during a production run, an untensioned product length $L_0(t)$ over time t:
    $L_0(t)=L_1(t)/(1+\epsilon_1(t))$, where, at any given time t, $L_0$ is the untensioned product length, $L_1$ is the tensioned repeat length at the span, and $\epsilon_1$ is the elastic strain of the web in the span;
    and wherein $\epsilon_1=T_1(t)/E(t)$, where $T_1$ is the tension at the span, and E is the web modulus.

12. The press of claim 11, further comprising a tension sensor for sensing a tension in the span, the controller coupled to the tensor for detecting the tension $T_1$.

13. The press of claim 12, wherein the tension sensor is a first tensioning roller, and wherein the first tensioning roller is one of the plurality of rollers, the first tensioning roller located upstream and adjacent to a first driven roller, wherein the first driven roller is one of the plurality of rollers.

14. The press of claim 13, comprising a second tensioning roller for detecting a tension $T_2$, and wherein the second tensioning roller is one of the plurality of rollers, the second tensioning roller located upstream and adjacent to a second driven roller, wherein the second driven roller is one of the plurality of rollers.

15. A system for determining an untensioned product length of a web moving through a printing press under tension, comprising:
    a first tensioning roller, the moving web contacting the first tensioning roller;
    a first roller located downstream of the first tensioning roller, the first roller driving the web, a first span of the web extending between the first tensioning roller and the first roller;
    a first motor driving the first roller;
    a second tensioning roller located downstream of the first roller, the moving web contacting the second tensioning roller;
    a second roller located downstream of the second tensioning roller, the second roller driving the web, a second span of the web extending between the second tensioning roller and the second roller;

a second motor driving the second roller; and a controller, the controller detecting a tension $T_1$ in the first span with the first tensioning roller, the controller detecting a tension $T_2$ in the second span with the second tensioning roller, the controller calculating an untensioned product length as a function of $T_1$, $T_2$, drive setpoints for the first and second motors, a web thickness of the web (h), and a reference repeat length ($CO_{REF}$).

16. The system of claim 15, wherein the drive setpoints include a drive setpoint $\alpha_1$ of the first motor for transport gains for tension ($T_1$), a drive setpoint ($\beta_1$) of the first motor for transport gains for repeat length of the first span, a drive setpoint ($\alpha_2$) of the second motor for transport gains for tension ($T_2$), a drive setpoint ($\beta_2$) of the second motor for transport gains for repeat length of the second span.

17. The system of claim 16, wherein the controller calculates the untensioned product length ($L_0$), according to the formula:

$$L_0 = \left(CO_{REF}(1+\alpha_1)(1+\beta_1)\left(1+\frac{(h/2)}{R_1}\right)\right) \Big/ (1+T_1/E),$$

where $$E = \frac{T_2 - T_1}{(1+\alpha_2)(1+\beta_2)\left(1+\frac{(h/2)}{R_2}\right) - (1+\alpha_1)(1+\beta_1)\left(1+\frac{(h/2)}{R_1}\right)}$$

and $R_1$ is a radius of the first roller and $R_2$ is a radius of the second roller.

18. The system of claim 15, further comprising a first idler roller forming a first non-slip nip with the first roller.

19. The system of claim 18, further comprising a second idler roller forming a second non-slip nip with the second roller.

20. The system of claim 15, wherein the web is arranged in a capstan wrap around at least one of the first roller and the second roller.

* * * * *